March 15, 1955 M. D. McFARLANE ET AL 2,704,306
FACSIMILE PHASING SYSTEMS
Filed Feb. 21, 1951 3 Sheets-Sheet 1
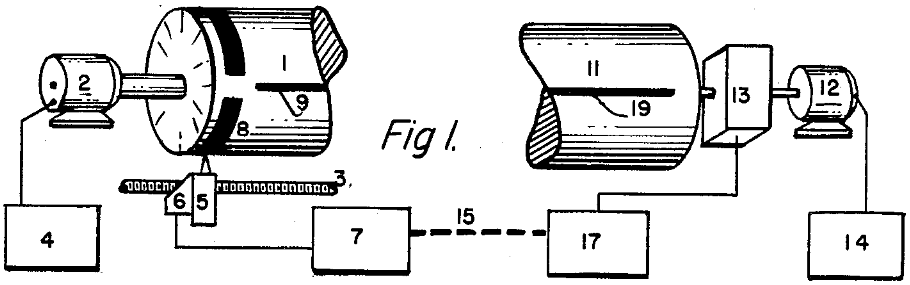
Fig I.
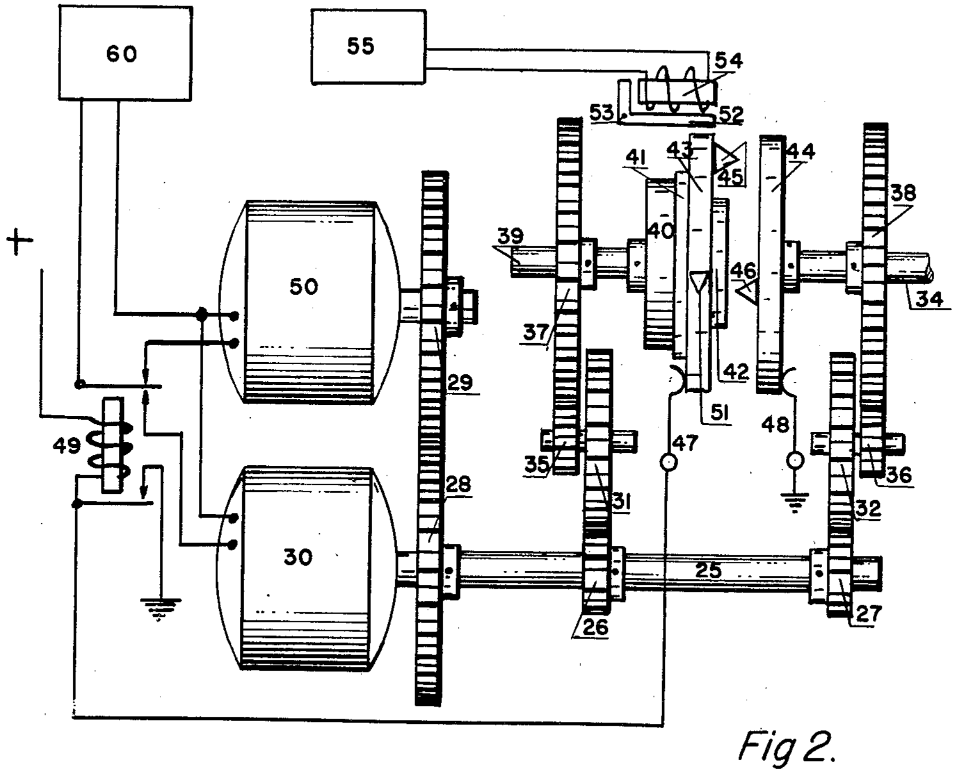
Fig 2.
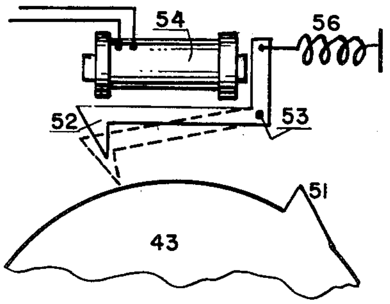
Fig 3.
INVENTORS:

March 15, 1955 M. D. McFARLANE ET AL 2,704,306

FACSIMILE PHASING SYSTEMS

Filed Feb. 21, 1951 3 Sheets-Sheet 2

INVENTORS:

March 15, 1955 M. D. McFARLANE ET AL 2,704,306

FACSIMILE PHASING SYSTEMS

Filed Feb. 21, 1951 3 Sheets-Sheet 3

INVENTORS:

Maynard D. McFarlane

George A. Bouvier 2,704,306
Patented Mar. 15, 1955

2,704,306

FACSIMILE PHASING SYSTEMS

Maynard D. McFarlane and George A. Bouvier, Sierra Madre, Calif.

Application February 21, 1951, Serial No. 212,032
6 Claims. (Cl. 178—69.5)

This invention relates to the art of facsimile communication, that is to the transfer of graphic intelligence from point to point, and has particular reference to a new and improved method of and means for securing proper phase relationship between the terminal equipment used for the facsimile process. The invention is adaptable for use with any communication means which is suitable for the transmission of the required facsimile signals.

It is well established in the facsimile art that for correct registration of the received copy on a recording sheet it is necessary that the transmitting and receiving equipment shall be operating not only in synchronism but in phase or in frame with each other. This invention relates to the automatic phasing (or framing) of one equipment with the other under the control of signals transmitted over the communication channel.

In normal practice in the facsimile art, the receiving mechanism is phased with the transmitting mechanism, since the signal is transmitted in that direction during the transmission of the facsimile. This convention has been followed below, but while in the following description and claims and in the accompanying drawings the phasing mechanism is shown as a part of the facsimile receiver, it is clear that the same principle of operation may be followed with the phasing mechanism at the transmitter if phasing signals are sent in that direction: specifically this may occur in the case of a two-way circuit with one station designated as the master station. The invention is not therefore limited to the use of the improved phasing system solely at the receiver or at the receiving end of the facsimile circuit.

In carrying out the phasing operation according to this invention it is necessary to have a phasing signal sent from the transmitter to the receiver. This signal may take any convenient form, and may be produced in any suitable manner, but for the purpose of description of the invention, the signal used by the U. S. Government in its National Weather Map Network will be considered as the phasing signal, it being clearly understood that the invention is in no way limited to the use of this particular phasing signal. The phasing signal used as an illustrative example therefore consists of a continuous black signal interrupted once each second by a white signal of fifty milliseconds duration—black being the tone of maximum signal amplitude: this signal may be produced by a ring adjacent to the start of the copy on the transmitting drum so arranged as to cooperate with the scanning light and the photocell at the transmitter to send out the required signal.

In facsimile systems synchronism between the terminal equipments is normally maintained by a transmitted signal or by the use of high-accuracy frequency controlled sources operating independently at each station. For the purposes of describing the operation of this invention the latter system will be used, though it is clear that any suitable system of synchronism may be used without departure from the spirit of this invention. In the following description therefore the facsimile apparatus at each station will be considered to be driven by an individual electronically controlled source of power, which may conveniently be 60 cycle 115 volt single phase power adapted to drive conventional types of synchronous motors. No phase relationship is postulated between these independent sources, and their frequency limits are such that they may not be in absolute synchronism, but will be within say one part in one million at all times: this degree of synchronism is sufficient for the satisfactory transmission of facsimiles.

According to a preferred form of this invention, therefore, the phasing mechanism forms a part of the receiver apparatus. Provision is made in the receiver mechanism to run the receiver scanning unit (drum, helix, stylus, etc.) during the phasing operation at a speed which differs from the synchronous speed at which recording is to be accomplished. By such action, the relative phase of the receiver with respect to the transmitter is constantly changing, so that during the time of the phasing operation, there will occur a position of the two mechanisms when they will be in phase with one another. By creating a phase-coincidence pulse at the time at which this occurs, the speed of the receiver mechanism can be changed at that point to the synchronous speed of the transmitter, and the two mechanisms will thereafter continue to run in phase with one another.

Therefore at the start of the phasing sequence the receiver mechanism is driven at a speed different from the speed of the transmitter (preferably faster than the transmitter). This speed change may be accomplished, according to this invention, by means of gearing, by using a different drive motor during this period, or by changing the motor driving frequency. This speed change is effected under the control of an electrical circuit, so that proper control of this circuit can be caused to return the speed of the receiver mechanism to its synchronous speed.

On receipt of a phasing signal from the transmitter, or a series of phasing signals if required, a portion of the receiver mechanism is caused to start to revolve in synchronism and in phase with the transmitter: this portion carries a contact member. Cooperating with this is a contact member carried by a portion of the receiver arranged to rotate at the speed of the receiver. Thus the two units carrying the contact members are rotating at speeds corresponding to the transmitter and receiver speeds, and the contact members are approaching one another at a rate dependent on the difference of the speeds of the two mechanisms. By properly timing the contact members, the apparatus may be so arranged that at the instant of contact between the contact members the transmitter and receiver mechanisms would be in phase.

The contact between the contact members is arranged to operate the electrical circuit which changes the speed of the receiver mechanism to synchronous speed with the transmitter, and hence when the circuit is completed through the contacts the receiver mechanism is driven in synchronism and in phase with the transmitter, and remains in this condition as long as power is kept on the units or until a new phasing sequence is initiated.

An object of this invention is to provide a new and improved method of phasing facsimile apparatus, and for carrying out this operation automatically. A further object of the invention is to provide new and novel means for performing a phasing operation on two rotating members located at a distance from each other.

Yet another object of the invention is to furnish a mechanism having members rotating at both the speed of the facsimile transmitter and the facsimile receiver, and to provide for change of the receiver speed to correspond with the transmitter speed under control of said rotating members.

A further object of this invention is to provide circuitry for changing speeds as requisite and for establishing the correct speeds for the rotational members. Other objects of the invention will be apparent in the following description and the annexed drawings, which are appended hereto by way of illustration and are not in any way a limitation of the invention to those forms here illustrated.

In the drawings:

Figure 1 is a diagrammatic illustration of a facsimile system of a conventional type, but using the phasing system herein disclosed.

Figure 2 illustrates a phasing mechanism suitable for use in the apparatus shown in Fig. 1, and employing a double motor drive, only one motor being energised at one time.

Figure 3 is a diagram of a phasing latch mechanism which may be used in Fig. 2 and in other figures.

Figure 4:
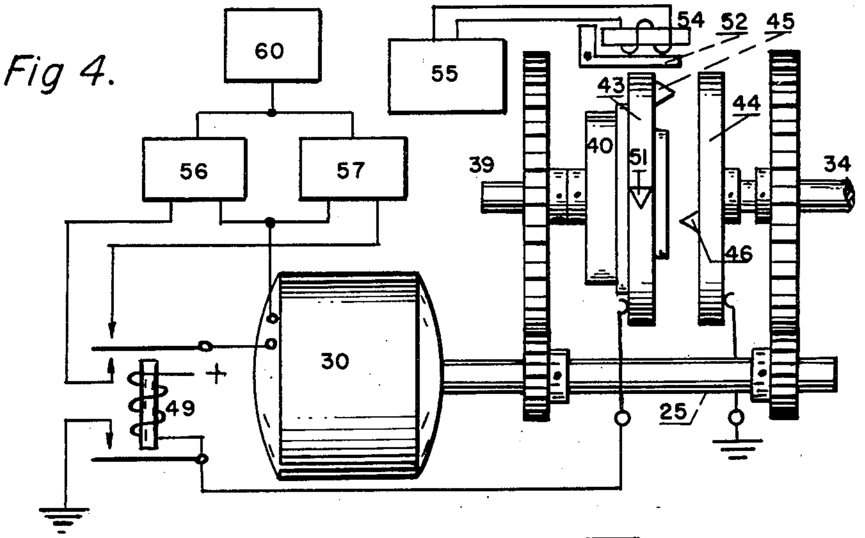
Figure 4 illustrates a similar arrangement to that shown in Fig. 2, but with a single motor drive and a double frequency supply to effect the change of speed.

In Fig. 1 are illustrated the elements of a facsimile system. At the left is the transmitter having a drum 1 driven by a motor 2 under control of a frequency control unit 4. This unit may conveniently consist of a crystal oscillator and divider network adapted to produce a suitable frequency for driving the motor 1, or it may consist of a tuning fork and associated circuits. Several forms of facsimile drive are well known in the art, and since the form of drive does not affect the present invention, any suitable frequency controlled drive may be used. A scanning unit comprising light source and optical system 5 and photoresponsive device 6 are caused to traverse the length of the drum under control of the lead screw 3, which is coupled to the drive motor by suitable gearing (not shown). The output of the photoresponsive device 6 is suitably amplified, and modulated if desired, to produce a suitable signal for transmission over channel 15 to the receiving station.

At the left hand end of the drum 1, and in a position to be scanned by the system 5—6 is shown a black band 8 with a gap opposite to the copy clamp-bar 9. The gap in the black band is of the requisite width to produce the fifty millisecond interruption in the continuous black signal above referred to as the phasing signal to be used by way of example in describing the operation of this invention. It is of course obvious that any other form of suitable phasing signal can be employed with the system here described, provided that the controlling devices are suitably adapted to handle the different signal, and that the phasing signal may be generated by any other suitable means.

As the transmitter is started, the scanning unit 5—6 is at the left of the drum 1, and under control of the lead screw 3, traverses the drum from left to right. At first no signal is sent to channel 15, as the scanner is scanning white. As the rum rotates, however, the scanner starts to pick up the black band 8, and as a result a signal is sent out, over the communication channel 15, which comprises a continuous black signal interrupted once per revolution of the sending drum 1 by a space of 50 ms. duration. The width of the band 8 may be made to correspond to the time required for the phasing operation as the scanner traverses the band at the normal scanning speed, so that the whole operation may be made automatic.

The signal from the photoresponsive device 6 is applied to the unit 7, where it is made suitable for transmission over the type of circuit used at 15. This circuit may be a wire line, a carrier circuit, or a radio link suitable for the transmission of the signals—the characteristics required from the communication channel are a function of the screening factor and the speed and diameter of the drum 1. Under certain circumstances the signal output from the unit 7 may be required to be an alternating signal of some predetermined subcarrier frequency, in which case the unit 7 may include a modulator whereby the subcarrier is modulated in amplitude or frequency by the output of the photoresponsive device 6. Suitable circuits for such purposes are well known in the art, and are described, for example, in the Electrical Engineers' Handbook, vol. V, 3rd edition, by Pender and McIlwain (published by John Wiley & Sons, New York), on pages 14–09 and 14–10.

The receiver, shown at the right of Fig. 1, comprises a drum 11 on which is mounted the recording medium. The drum 11 is provided with a clamp-bar 19 and is driven by a motor 12 through a phasing mechanism 13, and the motor 12 is controlled in speed by the device 14 in a similar manner to that performed at the transmitter by the device 4. The device 13 will be described below in connection with Figures 2, 4 and 5. The incoming signals over the channel 15 are passed through the amplifier 17 (described below in connection with Figs. 6 and 7) and are caused to control the operation of the mechanism in unit 13. The recording device and connection are not shown in this figure, since recording may be accomplished by any suitable means, of which several are well known in the art.

In operation of the receiver the incoming signals during the phasing period are caused to control the mechanism 13 and to vary the speed of the receiving drum 11 with respect to the speed of the transmitting drum 1 until the two drums 1 and 11 are in the desired phase relationship to secure proper recording of the received copy. It is to be noted that, while the receiver is here described as equipped with a drum 11, the invention is not limited to an apparatus having drum scansion members, and that the novel features disclosed and claimed herein are applicable to facsimile apparatus adapted for continuous page recording, and in fact have been applied in practice to such apparatus. For example, in a continuous page recorder using a helix and bar scanner the phasing mechanism may operate to control the position of the helix with respect to the bar so that the contact point between helix and bar occurs at the edge of the sheet at the instant that the transmitter is scanning the underlap of the copy, that is in the example given, the clamp-bar 9. Similarly with a continuous page recorder using travelling styli, the phasing control may be exercised to ensure that the start of a scanning stroke is phased with the scansion of the underlap portion of the copy (or with clamp-bar 9). In this way the scanning stroke in each case corresponds to the scansion of one line of the orignal copy from edge to edge.

The full sequence of operations of the apparatus shown in Fig. 1 therefore is: the motors at both machines are started, and at the transmitter the scanning mechanism at the left starts its traverse under control of the lead-screw. No signal is sent to the communication channel until the scanning light beam strikes the black band on the drum, when a high-level signal with short interruptions is sent out—this signal bears a definite time relationship to the position of the clamp-bar on the transmitter, so that the phasing when accomplished shall be relative to the clamp-bar. At the receiver the incoming signals are applied to the unit 17 and thence control pulses are sent to the mechanism 13 which mechanism serves to cause the receiving drum to rotate at a different speed to that of the transmitter drum until the two drums are in phase, at which time the device 13 causes the motor 12 to drive the receiving drum at the transmitter speed.

In Fig. 2 the details of one form of motor drive and phasing mechanism are shown. In this embodiment two motors 30 and 50 are shown, so arranged that when power is applied to either motor the complete mechanism is driven. The motors are driven by alternating current supplied from the control unit 60, which may be high-accuracy precision source of alternating current power. Conveniently this may take the form of the oscillator and divider system described by Ernst Norrman in the Proceedings of the Institute of Radio Engineers, vol. 34, No. 10, October 1946: or any other suitable frequency-controlled drive may be used.

The output of the frequency-controlled power unit 60 is applied through a relay 49 to either of the two motors 30 and 50. This relay is so arranged that power from the supply 60 is applied to only one of the motors at a time. The relay 49 is so arranged that during the phasing operation power is applied to the motor 50, and after the phasing has been achieved power is switched to the motor 30. Motor 50 drives shaft 25 through the agency of the gear 29 fastened to the motor shaft and associated meshing gear 28 fastened to the shaft 25. The shaft 25 is also an extension of the shaft of the motor 30. The ratio between the gears 28 and 29 is a function of the speed change necessary to effect the phasing operation in the time allotted. For example, if the drum 11 is rotated at 60 R. P. M. under normal operating conditions, and phasing is required to be accomplished in 30 seconds, a speed difference of 2 R. P. M. during the phasing operation is required, and the phasing speed of the drum 11 must be 58 R. P. M. or 62 R. P. M. Preferably the higher speed is used, for the reason that frictional losses aid the transfer to normal speed and thus the transfer may be accomplished in a short time.

The drum 11 (or the drive mechanism if any other form of scanning such as continuous page scanning, be used) is driven by the shaft 34. This shaft 34 is geared to the main drive shaft 25 through gearing 27, 32 and 36, 38. Considering again that the drum 11 is required to rotate at 60 R. P. M., and postulating by way of example only that the source 60 produces power at 60 C. P. S. and that the motors 30 and 50 are four-pole synchronous units and are similar to each other, then under receiving operating conditions the shaft 25 will be revolving at 1800 R. P. M., and the gear reduction between shafts 25 and 34 through the gear train 27, 32, 36, 38 will be 30:1. Also, in order to accomplish the phasing in the desired time, since the speed of the motor 50 is 1800 R. P. M., the gearing ratio in gears 29 and 28 must be 30:31, so that when the power is applied to the motor 50, the shaft 25 will be driven at a speed of 1860 R. P. M., which in turn drives the shaft 34 through the gears 27, 32, 36 and 38 at the desired speed of 62 R. P. M.

Also attached to the shaft 25 is the gear 26 meshing with gear 31, which drives shaft 39 through gears 35 and 37. The shaft 39 carries a flange 42 and a hub 40, and between the flange 42 and hub 40 is a friction member 41 and a contact disk 43. The pressure exerted on the members 41 and 43 by the positioning of the flange 42 and hub 40 is such that, under all ordinary conditions the disk 43 is carried with the shaft 39 without slippage. The disk 43 carries a projecting member 51 adapted to engage, under predetermined conditions, the magnetically controlled latch 52: the tension on the friction member 41 (which may, if desired, be cork faced) is such that when the projection 51 and latch 52 are engaged the disk 43 will slip on the shaft 39 and the shaft will continue to rotate at its designed speed.

The disk 43 is the element above referred to which is representative in speed and phase, during the phasing operation, of the transmitter drum. Thus, during the phasing operation, while the shaft 34 (and the receiver drum 11) is rotating at a speed different from the normal speed, the shaft 39 is rotating at the normal speed and may be used as a reference for that speed. It is thus clear that the speed ratio between the shafts 34 and 39 is the same as that between the two motors 30 and 50. Note that mechanically the shaft 39 could be driven from the motor 50 with the same gear ratio as that between the shaft 25 (motor 30) and the shaft 34, if desired, instead of from the shaft 25 with a different gear ratio. In the terms of the numerical example used, the gear ratio from the shaft 25 to the shaft 39 is 31:1, so that when the shaft 25 is being driven through the gears 29 and 28 by the motor 50 at a speed of 1860 R. P. M., the shaft 39 will be rotating at 60 R. P. M.

The shaft 39 is mounted substantially in line with the shaft 34, and the latter carries, adjacent to the disk 43, a similar member 44: the member 44 is however fastened to the shaft 34 and is not frictionally mounted. The disks 43 and 44 carry spring contact members 45 and 46, so proportioned as to make sliding contact between the points 45 and 46 as the disks rotate with respect to each other at their relative speed of rotation, which is the difference between the normal machine speed and the phasing speed. Each of the disks 43 and 44 is provided with a contact ring (not shown) by means of which the fixed contact members 47 and 48 can maintain electrical contact with the spring contact members 45 and 46 at all points of revolution.

The spring contact member 46 is so located physically on the disk 44 with respect to the clamp-bar 19 on the drum 11 that, with the projection 51 in contact with the latch 52, the spring 46 starts to make contact with the spring 45 (when the disk 44 is turned in its correct direction of rotation) at the instant at which the clamp-bar 19 and the recorder are in the position of starting a new scanning stroke.

The latch 52 (more clearly shown in Fig. 3) may be electromagnetically controlled by the coil 54. The latch 52 is held out of the path of the projection 51 on the disk 43 by means of the spring 56, but when the electromagnet 54 is energised the latch pivots about the pin 53 and the end of the latch is placed into the path of the projection 51. Thus it can be seen that, while the magnet 54 is not energised the disk 43 is free to revolve under pressure from the friction plate 41, but that when the magnet 54 is energised, the disk 43 will be stopped as soon as the projection 51 reaches the latch 52, and that the disk 43 will be released and will rotate with the shaft 39 as soon as the magnet is de-energised and the latch returned to its normal position by the spring

56. Control of the magnet 54 is exercised by the circuitry in unit 55, which is described in connection with Figs. 6 and 7 below.

The operation of the mechanism shown in Fig. 2 is as follows (figures in parenthesis relate to the numerical example above given):

When the main power to the unit is turned on, the relay 49 is de-energised, and the controlled power from the unit 60 is thus applied to the motor 50, which, through the gears 29 and 28, drives the shaft 25 at a speed above normal (in the example given, 1860 R. P. M.). This drives the drum or other scanning mechanism at a higher speed than normal, and the disk 44 is also driven at the high speed (62 R. P. M.). The shaft 39 is, through its gearing, driven at the normal speed of the machine (60 R. P. M.), and since no signals are present in the device 55, the latch 52 is retracted and the disk 43 is free to rotate with the shaft 39 (60 R. P. M.).

The circuit through the coil 54 is closed, either by the arrival of a phasing signal, or by the action of a time delay relay, or by other suitable means indicating preparation for the reception of a facsimile: when the coil is thus energised the armature is drawn to the coil, the latch 52 is drawn into the path of the projection 51, and the disk 43 is stopped when the projection 51 strikes the latch 52—this position corresponds to the passing of the clamp-bar in front of the scanning system of the transmitter. When the bar is in line with the light source, as shown in Fig. 1, a phasing signal is sent out to the communication channel, and upon receipt of the appropriate signal in the device 55, the circuit to the coil 54 is broken, and the magnet deenergised. Under the influence of the spring 56 the latch 52 is retracted to clear the projection 51, the disk 43 is thus released and rotates at the speed of (60 R. P. M.) which is in phase with the transmitter.

The disk 44 is rotating at the fast speed (62 R. P. M.) of the receiving mechanism, and at the instant of release of the disk 43 by the action of the latch 52, the contact member 46 on the disk 44 bears some random physical relationship to the similar member 45 on the disk 43: the displacement between the two contact members is a measure of the phase error in the transmitting and receiving mechanisms. Since the two disks 43 and 44 are rotating in the same direction at different speeds (60 and 62 R. P. M.), the contact member 46 is overtaking the contact member 45 at a constant rate of speed (2 R. P. M.). Since the location of the contact member 46 on the disk 44 bears a predetermined relationship to the location of the clamp-bar 19 or to the beginning of the scanning stroke, when the two contact members 45 and 46 establish contact, the receiving mechanism must be in proper phase with the disk 43, and therefore in phase with the transmitting mechanism.

Contact between the members 45 and 46 completes the circuit of the winding of the relay 49, and this relay is then operated. When this occurs, the power from the source 60 is transferred from the motor 50 to the motor 30, and the drive of the shaft 25, under control of the motor 30, is reduced to the normal recording speed of the receiver. Since the transfer of power from the motor 50 to the motor 30 is instantaneous, the phase relationship established during the phasing operation is unaltered, and since the receiving mechanism is now rotating at the transmitter speed, this phase relationship will be maintained.

The relay 49 is of the self-locking type. This keeps the drive on the correct motor after the contact members have separated due to the relative rotation of the disks 43 and 44, and it also serves to lock out the phasing mechanism from any operation by signals in the device 55.

It is to be understood that the receiving mechanism may be run at a slower speed than normal during the phasing operation, which in the case of the example previously given would mean that the disk 44 was rotated at 58 R. P. M. instead of 62 R. P. M. However, the higher speed for the receiving mechanism during the phasing operation is the preferred form, because at the moment of transfer of energy from the phasing motor to the running motor the latter can pick up the load more quickly when the frictional loads are assisting the speed change than when both frictional and inertia loads are opposing the speed change.

Figure 4 illustrates a similar mechanical arrangement to that shown in Fig. 2, except that the drive is by means of one motor 30, and the speed change is effected during the phasing period by a change in the motor speed, effected by a change in the frequency applied to the motor from the controlled frequency source 60. This change of frequency may be effected in many ways, for example by providing two controlled sources whose frequencies bear the desired ratio to each other, or by effecting a change of frequency in a single source, or as illustrated here by using a single source and arranging the divider chains so as to produce two outputs having the desired ratio. This invention, in this modification, is not limited to the use of any particular form of frequency change, but may be used with any appropriate system.

The gearing etc. of Fig. 4 is the same as that of Fig. 2, the main drive shaft 25 drives two gear trains, one of which drives the disk 43 through the friction member 41 and the other of which drives the disk 44 and, through the shaft 34, the receiving drum or other scanning mechanism. The motor 30 is directly coupled to the shaft 25, and the speed of the motor 30 is controlled by the frequency unit 60, operating either through the divider chain 56 or the chain 57. These chains may take the form shown in the article in the Proceedings of the Institute of Radio Engineers, supra, or any other convenient form. The two divider chains 56 and 57 are so arranged that the final output from each chain bears the desired ratio to the other, in other words, the ratio of the frequencies of the outputs of the two divider chains is the same as the ratio of the gear trains driving the disks 43 and 44. While the preferred form of this arrangement is to have the divider chain 57 (operable during the phasing period) the higher frequency source as compared to chain 56, so that on the completion of the phasing sequence the frictional loads aid the change of speed, the system will operate if the chain 57 should be made a lower frequency than the frequency of the divider chain 56.

The operation of the device of Fig. 4 is similar to that described above in reference to Fig. 2, with the relay 49 serving to effect the speed change of the shaft 25 and the receiver mechanism by changing the speed of the motor 30 by transferring the motor driving circuit from a high-speed source (divider chain 57) to the normal speed source (divider chain 56). The relay 49 may be a locking type relay, as above shown, and locks out the phasing pulses from having further effect on the operation of the mechanism.

Figure 5:
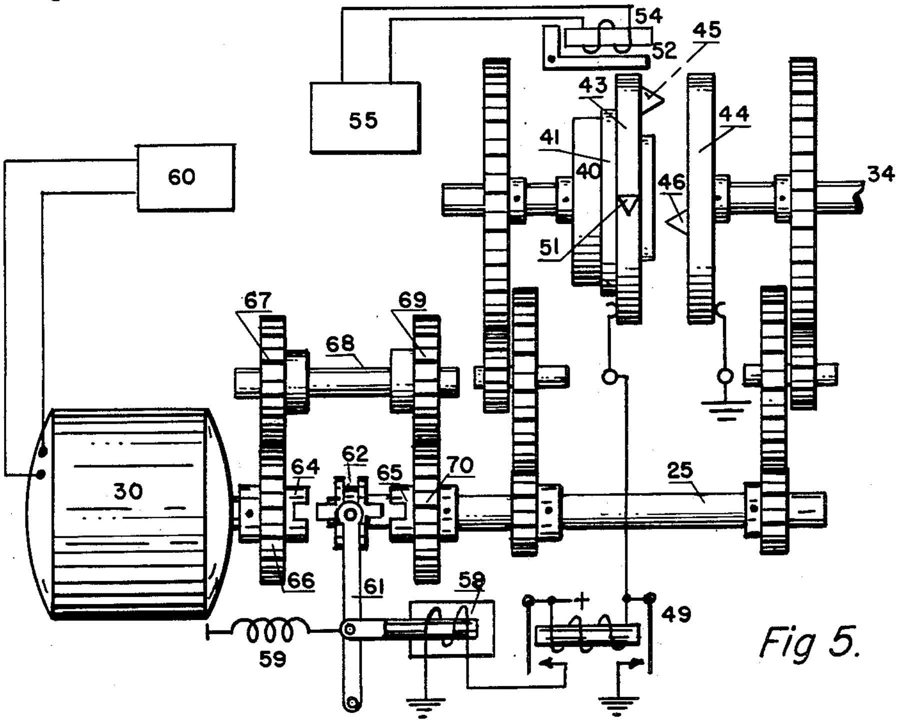
Figure 5 is similar to that of Fig. 4 except that the speed change is accomplished by a gear shift.

Figure 5 illustrates a further embodiment of the invention in which a similar mechanical arrangement to that shown in Figs. 2 and 4 is used, but the speed transfer is effected by mechanical rather than electrical means. In this figure the shaft 25 and its associated gearing driving the receiving mechanism and the disks 43 and 44 may be driven by a single motor through a mechanical speed changer represented by the gears 66, 67, 69 and 70 and the clutch member 64, 62, 65 operated by the arm 61 under control of the solenoid 58 and return spring 59.

In this modification the shaft of the motor 30 is splined and carries the dog 62. The gear 70 is fastened to the shaft 25 while the gear 66 rotates freely on the motor shaft. Both gears 66 and 70 carry clutch surfaces 64 and 65 adapted to engage the dog 62. The gear 66 meshes with the gear 67, which through the jackshaft 68 drives the gear 69 which meshes with the gear 70. The gear ratio of the chain is such that the speed of the shaft 25 when driven through the train bears the desired ratio to its speed driven directly. In terms of the previously given example, when the dog 62 is engaged with the face 64 of the gear 66 the motor 30 drives the shaft 25 at 1860 R. P. M., while when the dog 62 engages the face 65 of the gear 70, the shaft 25 is driven at 1800 R. P. M.

The position of the dog 62 is controlled through the arm 61 by the solenoid 53 acting against the spring 59, and the operation of the solenoid 58 is in turn controlled by the relay 49. This relay 49, at the start of the phasing operation, is de-energised, the solenoid 58 is likewise de-energised, and the spring 59 forces the dog 62 into engagement with the face 64 of the gear 66, so that the shaft 25 is driven (under control of the frequency control unit 60) by the motor 30 at an increased speed relative to its normal speed. At the conclusion of the phasing operation, when contact is made through the contact members 45 and 46, the relay 49 is energised, in turn energising the solenoid 58 and transferring the dog 62 from engagement with the face 64 of the gear 66 to the face 65 of the gear 70, thus driving the shaft 25 which is fastened to the gear 70 directly from the motor 30. As in the previous cases above discussed, the relay 49 may be of the locking type, and thus at the conclusion of the phasing operation the phasing circuits are locked out of the mechanism.

While above a dog clutch mechanism has been discussed for mechanically changing the speed of the drive from the motor to the main drive shaft, it is to be understood that the invention is not in any way limited to this form of clutch, which is here shown by way of example only. The dog clutch may be replaced by a magnetic clutch, or a cone clutch, or any other type of clutch having the desired characteristics without departure from the spirit of the invention here disclosed. Also without departure from the principles of this invention the clutch mechanism described may be replaced by a planetary or reverted epicyclic gear mechanism adapted to perform the necessary speed change. Also the same purpose may be achieved by the use of a differential gear arrangement, adapted to be driven during the phasing period by a synchronous motor and stationary during the running period, or the reverse as may be desired. It can thus be seen that there are many alternative forms of gear-box which may be inserted between the motor 30 and the drive shaft 25 to secure the speed change required to carry out the objects of this invention: and the invention is not limited to any specific form illustrated or mentioned.

An alternative method of securing the speed change with the mechanisms illustrated in Figs. 2 and 5 comprises applying power to the main drive motor all the time, and during the phasing operation rotating the stator of this motor (either by an auxiliary motor or by means of gearing and a clutch) so as to achieve the required speed change, since the speed of the drive shaft 25 relative to the frame of the mechanism will be the resultant sum (or difference) of the motor speed and the speed of rotation of the stator.

Figure 6:
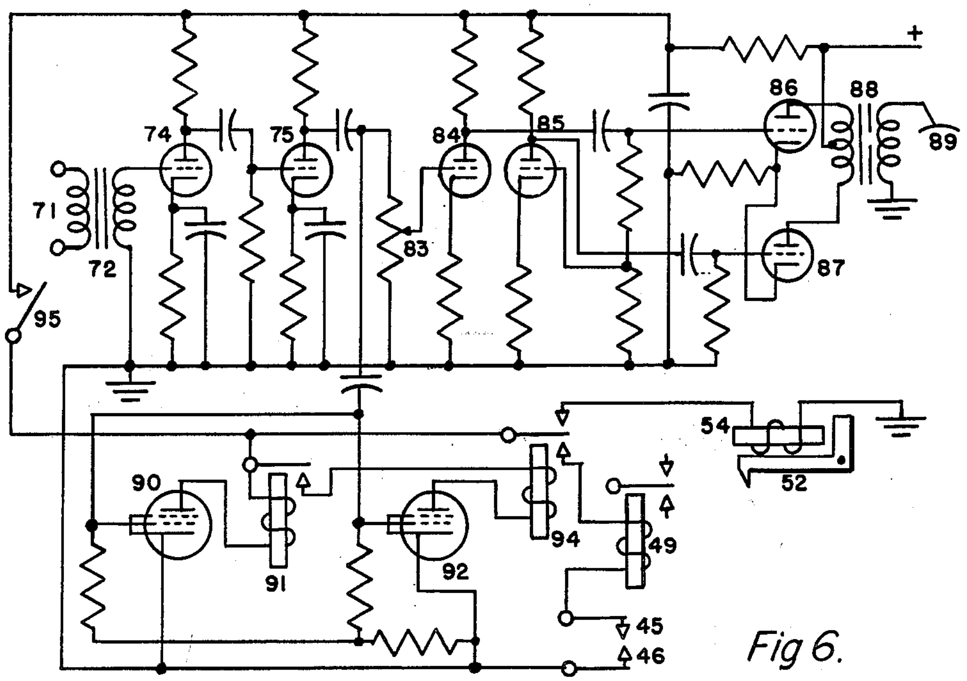
Figure 6 is a circuit diagram of one arrangement of a control apparatus which may be used to control the phasing operation.

In Figure 6 is shown a circuit diagram of apparatus suitable for controlling the operation of the phasing mechanisms shown in Figs. 2, 4 and 5. This circuit is here shown by way of example only, it being understood that many variations thereof may be constructed to carry out the principles of this invention. In Fig. 6 the incoming signal in the circuit 71 is applied through the transformer 72 to the tube 74, here shown as a conventional triode resistance coupled to the triode 75. The output of this latter tube 75 is applied through the volume control 83 to the grid of the tube 84, which is so connected with the tube as to form a phase-inverter feeding the grids of the tubes 86 and 87. These tubes 86 and 87 with the transformer 88 provide a push-pull output to the recording stylus 89. The circuit thus far described forms the normal recording circuit, the so-called "picture circuit."

A second output may be taken from the tube 75 ahead of the volume control 83, and is applied to the grid of the tube 90, which may conveniently be a thyratron. The same signal from the tube 75 is also fed through a condenser to the grid of the tube 92, which may also be a thyratron. Associated with the tube 90 is the relay 91, which is operated when the tube becomes conducting. The anode supply for the tube 92 passes through the contacts of the relay in such a manner that the tube 92 cannot be fired until the tube 90 has been fired and has operated the relay 91. The anode supply for both tubes 90 and 92 is controlled by the contacts 95, so that neither tube can be operated until the contacts 95 are closed.

The tube 92 has an associated relay 94 which is operated when the tube conducts. The back contact of this relay 94 is in a circuit between the contact 95 and the latch magnet 54, and the front contact of the relay 94 closes the circuit from the positive supply (through the contact 95) to the relay 49, rendering that relay operable by the closing of the circuit through the contact members 45 and 46.

The operation of the circuit is as follows: signals on the input circuit 71 are amplified and applied to the recorder: a branch circuit feed signals to the tubes 90 and 92 which form the phasing control network. The contact 95 is closed when a phasing signal is to be received from the transmitter—this closing of the contact 95 may be manual, or by a time control, or by any other desired means. When the contact 95 is closed, the latch magnet 54 is energised, thus throwing the latch 52 into the path of the projection 51 on the phasing disk 43. The first incoming phasing pulse fires the thyratron 90, supplied with anode current through the contact 95, and the second phasing pulse fires the thyratron 92, supplied with anode current through the contacts of the relay 91. It is necessary to have the second pulse operate the final circuits because it is essential that the projection 51 shall have engaged the latch 52, and a full pulse interval is required to ensure this engagement. The firing of the thyratron 92 energises the relay 94, which breaks the circuit of the latch magnet 54, thus releasing the disk 43 to rotate under drive from the friction members. The closing of the relay 94 thus starts the rotation of the disk 43 in phase with the transmitted signal, since the transmitted signal fires the thyratron 92 and operates the relay 94. The closing of the relay 94 also applies power to the relay 49, rendering that relay capable of operation when the phasing contacts 45 and 46 on the phasing disks make contact with each other. Since the thyratron 92 remains fired as long as the contact 95 is closed, the relay 94 remains in its operated position and the succeeding phasing signals are locked out from operation of the latch magnet 54 and hence have no effect. This lock-out feature also applies to the subsequent picture signals on the circuit, which are prevented from affecting the latch magnet 54 by the fact that the relay 94 remains in its operated position.

Figure 7:
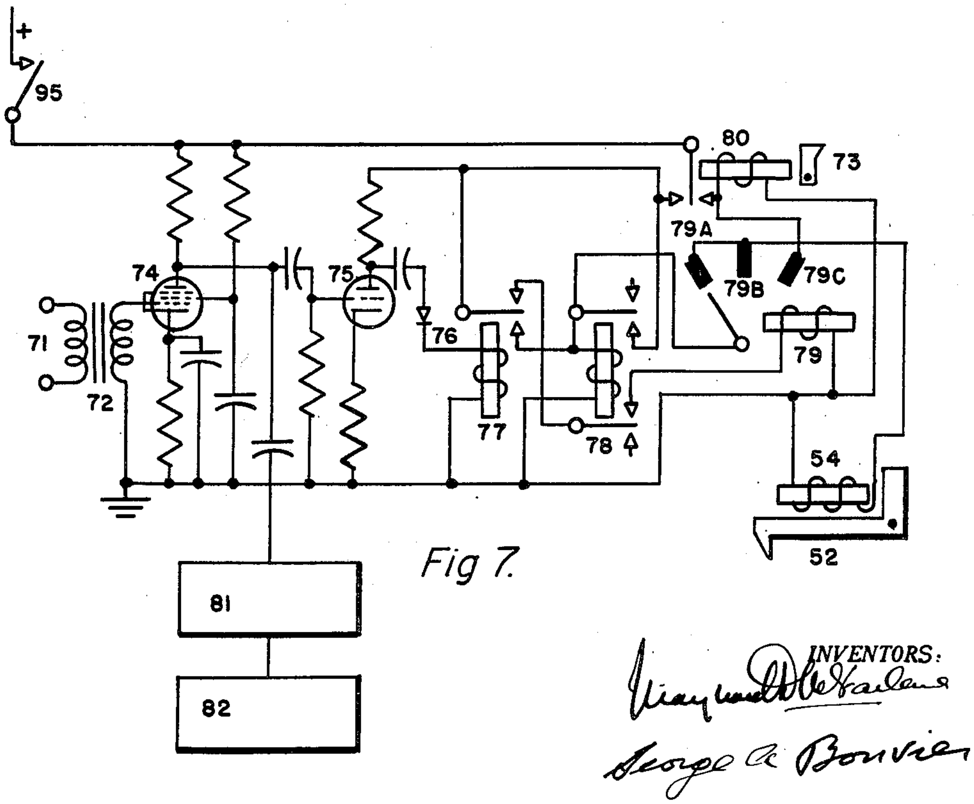
Figure 7 is a circuit diagram of another circuit capable of controlling the phasing function.

Figure 7 illustrates an alternative circuit for carrying into effect the above operations: in this example the thyratrons are replaced by relays, and the second-pulse control is effected by a stepping relay 79. As in Fig. 6, the incoming signals on the line 71 are passed through the transformer 72 to the tube 74 (here a pentode) and thence to the units 81 and 82 which are representative of the amplifier (tubes 84, 85, 86 and 87 and associated networks) of Fig. 6, while 82 represents the recorder shown at 89 in Fig. 6. A branch circuit from the output of tube 74 is applied to tube 75, rectifier 76, and the relay string. The relay 77 is responsive to the pulses amplified by the tube 75 and rectified by the rectifier 76. Arrival of a pulse after the contact 95 is closed operates the relay 77 and the relay 78, and the relay 78 locks up by its top contact. Through the bottom contact of relay 78 the pulse from the relay 77 is applied to the winding of the relay 79, which is shown as a stepping relay. This relay 79 steps in accord with the pulsing of the relay 77, that is in accord with the incoming phasing pulses from the transmitter. As soon as the relay 77 is operated, power is applied to the latch magnet 54, and the operation of the relay 78 keeps this power on so that the latch 52 is placed in the path of the projection 51 on the disk 43. The next transmitted pulse moves the step contact to 79B, but the circuit to the latch magnet 54 remains made. The next pulse however moves the contact to 79C, and the circuit to latch magnet 54 is broken, thus removing the latch 52 from the path of the projection 51 and releasing the disk 43. Contact on segment 79C also operates the relay 80, which removes anode potential from the phasing circuits (tube 75 and relays 77, 78 and 79) and is itself locked up through its own contact thus preventing any further phasing signals from affecting the operation. Relay 80 also resets the stepping relay 79 by release of catch 73. Relay 80 remains locked up until the contact 95 is opened at the end of a transmission: as stated above, contact 95 may be manually or automatically controlled in any desired manner.

It is thus seen that the cooperation of circuits shown in Figs. 6 or 7 with the mechanisms shown in Figs. 2, 4 or 5 will result in an operative structure capable of performing the phasing operation described. It is clear that Figs. 2, 4 and 5 illustrate alternative means for performing the same operation, that is, the change in speed of the recorder mechanism, and for providing a method of determining the instant at which the desired phase relationship is secured by the coincidence of the contacts on the two phasing disks: the differences between the structures shown in these figures reside in detail and not in any major feature. Similarly, Figs. 6 and 7 illustrate alternative forms of control circuits: both are operated by the same type of incoming signal, both are arranged to select the second phasing pulse, and both operate the latch mechanism in the same manner. Also either of the circuits shown in Figs. 6 and 7 may be used with any of the arrangements shown in Figs. 2, 4 and 5 at will. Further, it is to be noted, that it requires an electrical device (Figs. 6 or 7 or equivalent) and a mechanical unit (Figs. 2, 4 or 5 or equivalent) to perform the full functions of the invention—both a speed change device and a control device are necessary to accomplish the function of phasing.

Where in the appended claims reference is made to a recorder, it is to be understood that this relates to a mechanical unit on which is disposed a recording surface upon which is to be reproduced a facsimile of the original subject copy at the transmitter. And it is to be understood that, as described above, as far as phasing is concerned the functions of receiver and transmitter may be interchanged: at that time, however, for the purposes of phasing, the transmitter becomes a reeciver, as under those circumstances the transmitter unit is receiving phasing signals from the receiver unit. When this interchange of function takes place, the transmitter drum bearing the original subject copy becomes, for the purposes of phasing, the "Recorder."

Having now described our invention and illustrated certain embodiments thereof by way of example, we claim:

1. In a facsimile receiver adapted to be driven at one speed during the phasing operation and at a different speed during the recording of a facsimile, means to drive the recorder mechanism either at a phasing speed or at a recording speed, a shaft geared to the drive so that when the drive is at the phasing speed the shaft is at recording speed, a frictionally driven member on said shaft, a latch to hold said friction member stationary, means to release said latch under control of transmitted signals, a contact on said friction member, a corresponding contact adapted to cooperate with said first contact on a shaft rotating at the drive speed, a source of signals representative of the phase of a transmitting unit, means to apply said signals to said latch release means so that the friction member is released in a predetermined phase relationship with the signal source, and means independent of said signal source to cause connection between the contacts on the two members to change the drive speed of the recorder mechanism from the phasing speed to the recording speed.

2. In a facsimile system having a transmitter and a receiver and a communication channel connecting them, means to drive the recorder at either of two different speeds, one of which is the phasing speed of the mechanism and the other the recording speed, means effective when the mechanism is driven at the phasing speed to rotate a phasing member at the recording speed substantially equivalent to the transmitter speed, means to phase said member with the transmitter through the agency of transmitted signals and then to render the phasing operation independent of said transmitted signals, means to establish the subsequent time at which said member is also in phase with the recorder mechanism, means to produce a signal at phase coincidence, and means responsive to said signal to change the speed of the recorder mechanism from the phasing speed to the recording speed.

3. In a device of the class described a facsimile receiver adapted to be driven at either of two speeds having a predetermined relation to one another, a friction member associated with the recorder mechanism and so driven at the ratio of the two speeds that when the recorder mechanism is driven at the phasing speed the member is driven at the recording speed, a latch capable of engaging said friction member, means effective at the start of a recording operation to first drive the recording mechanism at its phasing speed and means operative at the start of reception to cause said latch to engage said member, a circuit adapted to be operated by incoming signals to release said latch when received phasing signals from the transmitter are present to energise said circuit, mechanism independent of the received signals associated with said friction member to determine the subsequent time of phasing of the recorder mechanism, and means to change the speed of the recorder to the recording speed at that time.

4. In a facsimile system a receiver adapted to be driven at two related speeds, a friction member driven by the mechanism at a ratio such that when the device is being driven at the phasing speed the friction member is driven at the recording speed, means operative at the start of a reception to drive the recorder at the phasing speed and the friction member at the recording speed, a stop member capable of stopping said friction member, circuit means operative at the start of a reception to cause said stop to hold said friction member in a predetermined position, a series of received phasing signals, a first circuit adapted to be energised by one of said signals and to render a second circuit operable by a later signal, means under control of said second circuit to release said friction member on receipt of a phasing signal, means associated with said friction member to establish the time of phase correspondence of the recorder mechanism with the transmitter, and means to change the speed of the recorder to the recording speed at that time.

5. In a facsimile system a transmitter mechanism for scanning an original subject copy and as a result of said scansion producing signals for transmission over a communication channel, means to drive said transmitter mechanism at a predetermined speed, substantially constant, and to produce phasing signals whose timing is related to a fixed phase of the transmitter mechanism: a communication channel adapted for the transmission of the facsimile and phasing signals from the transmitter to a receiver: a receiver for said system adapted to record the signals from the communication channel and to produce a facsimile record from the facsimile signals, said receiver having a recording mechanism and an adjacent frictionally driven member: means to drive the recording mechanism at a speed different from the recording speed associated with the transmitter speed while the friction driven member is driven at a speed which does not differ materially from the transmitter speed: means to phase the friction member with the transmitter through the agency of the transmitted phasing signals independently of the phase of the receiver mechanism, and means independent of the transmitter or transmitted signals for subsequently establishing phase coincidence between the friction driven member and an adjacent portion of the receiving mechanism.

6. In a facsimile system having a transmitter and a receiver adapted for the transmission and reception of graphic intelligence over a communication channel from point to point, means to drive the transmitter mechanism at a substantially contact speed and to produce therefrom at different times both intelligence signals and phasing signals, said phasing signals bearing a fixed relationship to the phase of the transmitter mechanism: means to transmit and receive said signals: means to drive the receiving mechanism at will at either a first speed which differs from the transmitter speed or a second speed which is substantially that of the transmitter mechanism, said receiving mechanism having associated therewith a frictionally driven member adjacent to a portion of the recording mechanism, said member being so driven that when the receiver mechanism is driven at the first speed the member is driven at the second speed: means effective through the agency of the transmitted phasing signals and the friction drive to phase the member with the transmitter independently of the phase of the receiving mechanism at that time, said phasing being effective when the receiver is driven at the first speed: means independent of the transmitter or the transmitted signals for subsequently establishing phase coincidence between the frictionally driven member and the adjacent portion of the recorder mechanism, and means effective upon said coincidence for changing the speed of the recording mechanism from the first speed to the second speed for the registration of the transmitted facsimile signals.

References Cited in the file of this patent

UNITED STATES PATENTS

| | | |
|---|---|---|
| 2,492,621 | Cooley | Dec. 27, 1949 |
| 2,522,919 | Artzt | Sept. 19, 1950 |
| 2,530,516 | Finch | Nov. 21, 1950 |
| 2,538,547 | Young | Jan. 16, 1951 |
| 2,540,922 | Wiekham | Feb. 6, 1951 |
| 2,543,787 | Long | Mar. 6, 1951 |
| 2,556,970 | McFarlane | June 12, 1951 |